Patented Nov. 18, 1924.

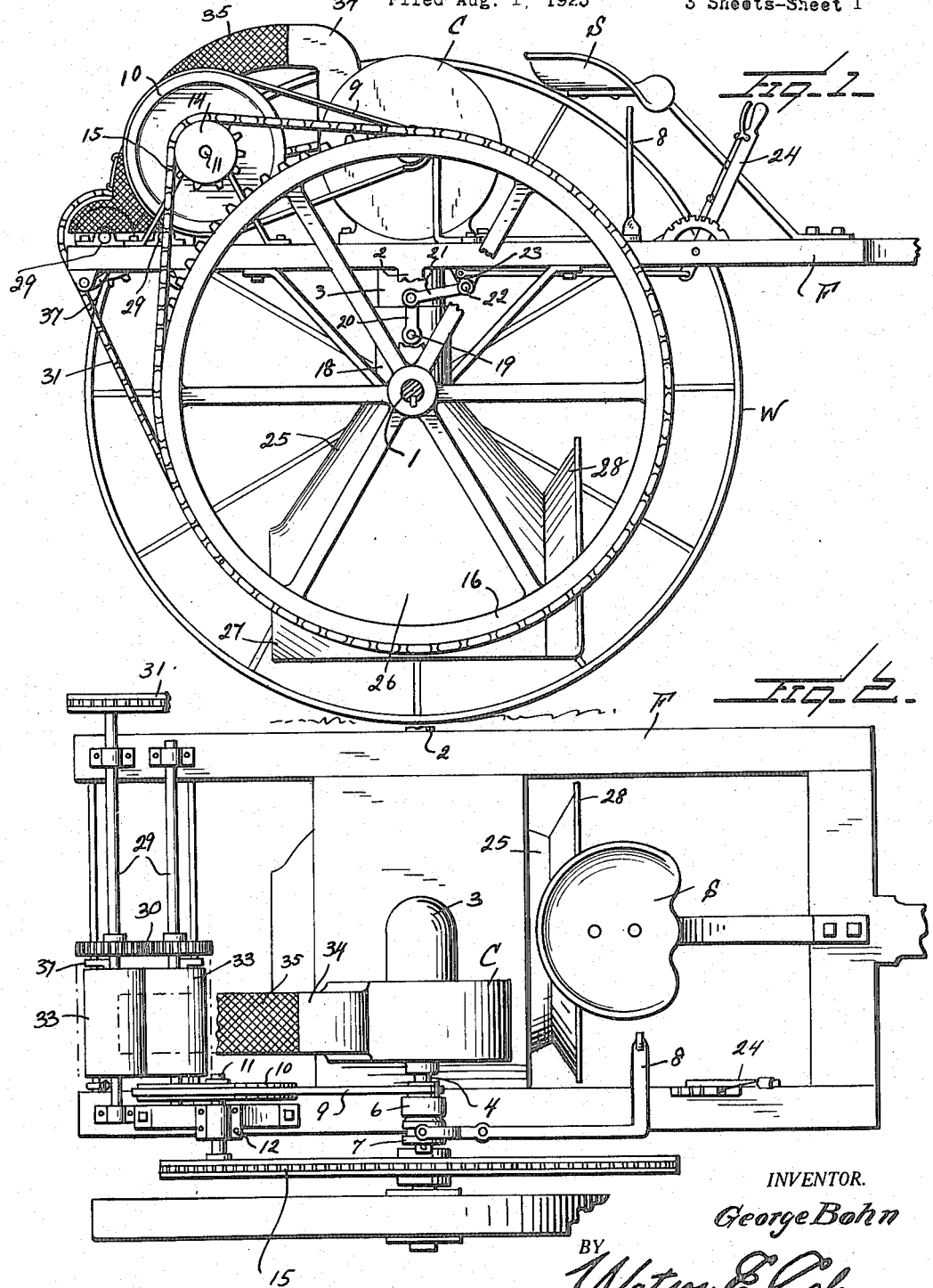

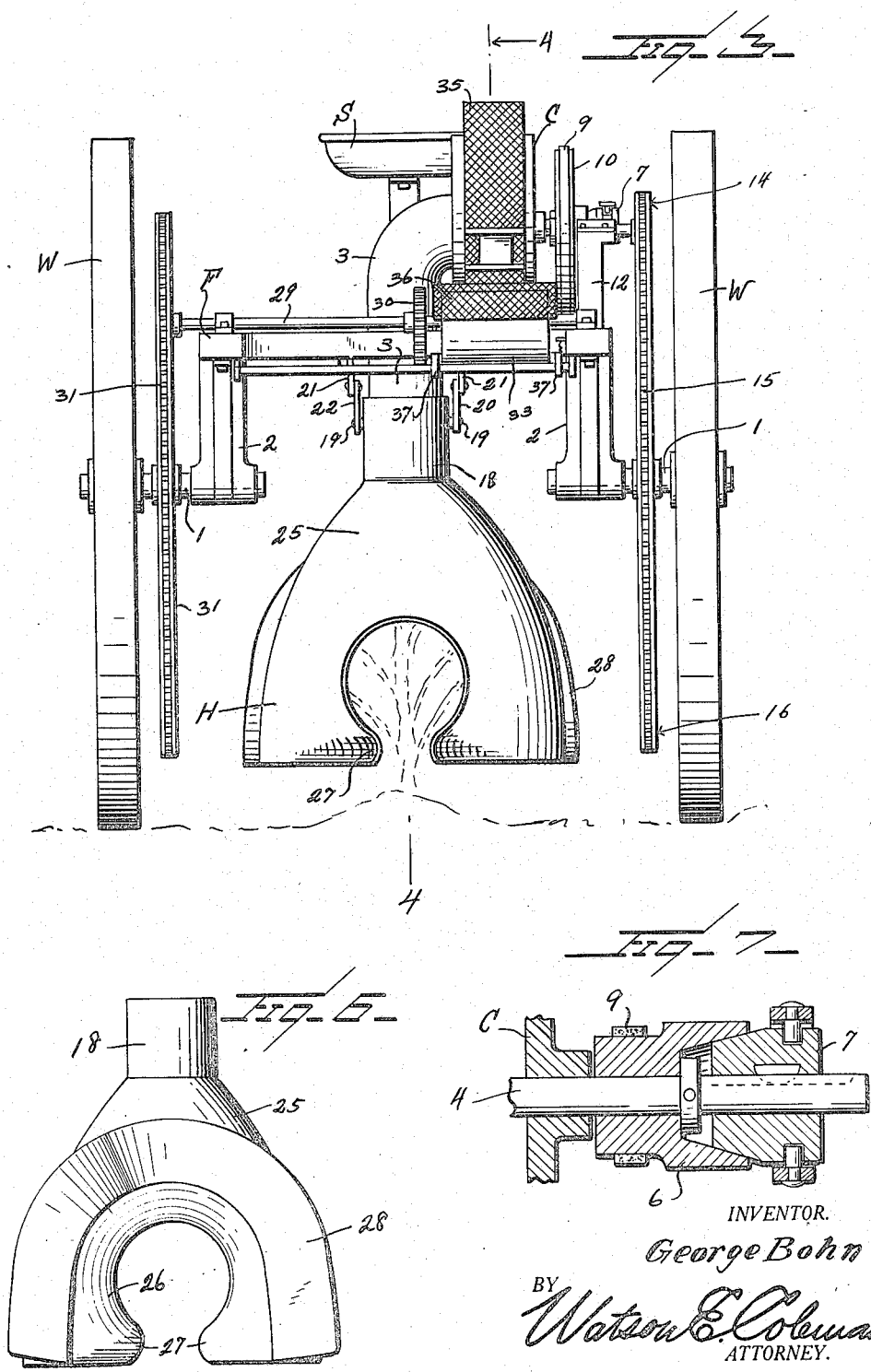

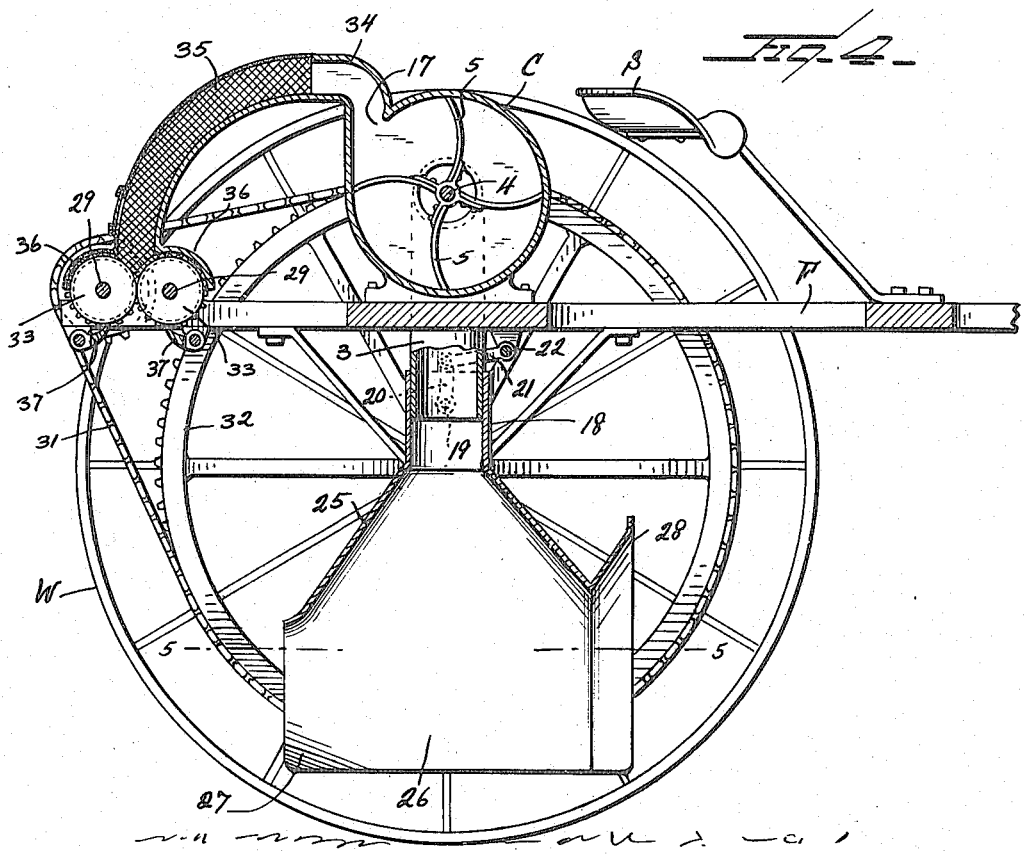
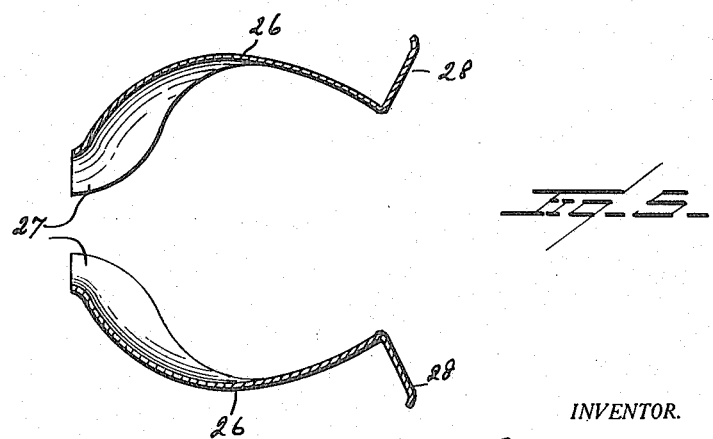

1,515,826

UNITED STATES PATENT OFFICE.

GEORGE BOHN, OF FOUKE, ARKANSAS.

INSECT-CATCHING AND COTTON-PICKING MACHINE.

Application filed August 1, 1923. Serial No. 655,082.

*To all whom it may concern:*

Be it known that I, GEORGE BOHN, a citizen of the United States, residing at Fouke, in the county of Miller and State of Arkansas, have invented certain new and useful Improvements in Insect-Catching and Cotton-Picking Machines, of which the following is a specification, reference being had to the accompanying drawings.

This invention relates to certain improvements in insect catching and cotton picking machines and it is an object of the invention to provide a novel and improved device of this general character adapted to travel along a plant row and provided with pneumatic elements for collecting insects upon the plants or to gather cotton.

Another object of the invention is to provide a novel and improved machine of this general character which will effectively remove and gather insects, such as boll weevils, without injury to the plants together with means for destroying the life of the gathered insects.

A further object of the invention is to provide a novel and improved device of this general character embodying a portable structure provided with a pair of spaced aprons which are adapted to be disposed on opposite sides of the plant row whereby the plants are effectively agitated during travel of the machine to dislodge the insects therefrom together with means for gathering and destroying the insects so dislodged.

The invention consists in the details of construction and in the combination and arrangement of the several parts of my improved insect catching and cotton picking machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a machine constructed in accordance with an embodiment of my invention;

Figure 2 is a fragmentary view in top plan of the structure as illustrated in Figure 1;

Figure 3 is a view in rear elevation of the machine as herein disclosed;

Figure 4 is a vertical sectional view taken substantially on the line 4—4 of Figure 3;

Figure 5 is a horizontal sectional view taken substantially on the line 5—5 of Figure 4;

Figure 6 is a view in front elevation of the aprons; and

Figure 7 is an enlarged fragmentary sectional view taken through the clutch mechanism as herein employed.

As herein disclosed, my improved machine comprises a frame F of desired configuration and dimensions and which is supported by the wheels W, each of said wheels being fixed to a stub axle 1 rotatably supported by an under-hung bearing 2 carried by the frame F. Supported by the frame F to one side of the transverse center thereof is a fan casing C having in communication with the central portion of the inner side wall thereof an induction pipe 3, said pipe extending downwardly at substantially the transverse center of the frame F and terminating there below as is clearly illustrated in Figures 1, 3 and 4 of the accompanying drawings.

Rotatably supported by the outer face wall of the casing C is the shaft 4 which extends inwardly of the casing and has suitably affixed thereto the fan blades 5. Loose on the extended portion of the shaft 4 is a clutch member 6 with which coacts the clutch member 7, said member 7 being keyed to the shaft 4 for rotation therewith but capable of movement lengthwise of the shaft. Associated with the member 7 is a lever 8 for throwing the clutch member 7 into or out of engagement with the member 6.

The clutch 6 is driven by a belt 9 or the like passing around the member 6 and also around a pulley 10 rotating with the shaft 11. The shaft 11 is rotatably supported by an upstanding bearing 12 carried by the frame F and extends beyond the opposite sides thereof. The outer end portion of the shaft 11 has fixed thereto a sprocket 14 around which passes the sprocket chain 15 also disposed around a relatively large sprocket wheel 16 keyed to the shaft 4. By this means as the machine is in transit, and with the members 6 and 7 in working engagement, the shaft 4 together with the blades 5 will be rotated at requisite speed to create a pronounced suction upwardly through the pipe 3 and to create a draft outwardly of the discharge opening 17.

Telescopically engaged with the lower end portion of the pipe 3 and fitting snugly thereon is a sleeve 18, said sleeve having pivotally engaged therewith at diametrically opposed points, as at 19, the links 20. Each of these links is also pivotally engaged with a rock arm 21 extending rearwardly from a rock shaft 22. The shaft 22 adjacent to an end thereof is provided with an upstanding rock arm 23 operatively engaged with a lever 24 positioned adjacent to the seat structure S. By proper manipulation of the lever 24 the sleeve 18 may be vertically adjusted as the occasions of practice may prefer.

The sleeve 18 extends upwardly from a hood 25 and is in communication therewith, the front and rear ends of said hood being open to provide the aprons 26. The hood 25 is substantially concavo convex in form with its convex face outwardly disposed and the aprons 26 are a continuation of the side walls thereof, said aprons having their lower rear portions pressed inwardly as at 27. The forward or entrance opening is of a height in excess of the height of the rear opening and said forward opening is defined by the outwardly and upwardly inclined flange 28.

In practice, the hood is adapted to be traversed over a plant row and the plants will be separately received between the aprons 26, said entrance being facilitated by the flange 28. The flange 28 also serves to bend the stalk or plant downwardly so that as said stalk or plant passes within the hood, said stalk or plant will quickly bound to its upright or normal position and which action operates effectually to dislodge the insects on the plant. As the plant bounds or jumps upwardly to its normal position the upper portion thereof will also forcibly strike the rear portion of the hood above the rear or exit opening of the hood and thereby provide further means to effect the desired dislodgement of the insects. By having the entrance opening of the hood of a height greater than that of the exit opening, and also of a greater width, as particularly illustrated in Figure 6 of the accompanying drawings, provision is made whereby the suction created by the fan blades 5 will collect the insects or squares which may drop upon the ground and in advance of the hood. The inwardly disposed portions 27 at the rear of the hood serve effectively to assure the major suction action to occur at the forward end of the hood.

While I do not wish to be understood as limiting myself to the exact dimensions of the hood 25 and the aprons 26, yet in practice I find it of particular advantage to have the same of such size as to completely retain or house therebetween a single plant. The aprons 26 are preferably of a length that as the aprons are leaving one plant a succeeding plant is in the central portion of the hood and a third plant just about to be received between the aprons.

While I have hereinbefore described the hood 25 and the aprons 26 being used in the dislodgement of insects, it is to be understood that the same may be employed with advantage in the gathering of cotton, the cotton being collected by suction, and the agitation of the plant accomplished through the medium of the aprons 26 facilitating the operation.

Rotatably supported by the rear end portion of the frame F and disposed transversely thereof are the parallel shafts 29 to which are fixed the intermeshing gears 30 whereby the shafts are caused to rotate in unison but in reversed directions. One of the shafts 29 extends beyond the side of the frame remote from the shaft 11 and said extended portion has operatively engaged therewith an endless chain 31 which also passes around a sprocket 32 fixed to the adjacent axle 1. Fixed to adjacent portions of the shafts 29 are the crusher rollers 33 upon which discharges from above a conduit 34 leading from the discharge opening 17 of the casing C. The side and top walls of the conduit 34 along a major portion thereof are reticulated as at 35. The outer or discharge end of the conduit 34 is enlarged as at 36 to extend partially around the adjacent rollers 33 and at a point in close proximity thereto.

The insects drawn from the plants by the suction created by the blades 5 are forced by the blast through the conduit 34 and discharged upon the rollers 33. These rollers rotate in reversed directions and from above one toward the other so that the insects passing therethrough are crushed. Contacting from below with the rollers 33 are the scrapers 37 which serve to maintain the surface of said rollers clear and more particularly to remove the crushed carcasses which have a tendency to adhere to the rollers.

In view of the fact that the rollers 33 are located substantially behind the fan casing C it is obvious that the carcasses will be discharged upon the ground in close proximity to the plant row instead of being indiscriminately scattered broad-cast.

It is to be understood that the size of the hood 25 and its associated aprons 26 depend upon the size of the plants and it is also to be understood that when the device is employed for the purpose of gathering cotton the rollers 33 and the parts concomitant thereto are removed.

This application is a continuation in part of my application Serial No. 526,664, filed January 3, 1922.

From the foregoing description it is thought to be obvious that an insect catching and cotton picking machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A device of the character described comprising a portable frame, a tubular member depending from said frame, suction means associated with said tubular member, a hood supported by the frame, the tubular member being in communication with the hood through the top and at substantially the center of the hood, the opposite ends of the hood at the lower portions thereof being provided with openings, one of said openings constituting an entrance and the other an exit, the entrance opening being of a width and height greater than the width and height of the exit opening, said openings being in the lower portion of the hood, the entrance opening being defined by an outwardly inclined flange.

In testimony whereof I hereunto affix my signature.

GEORGE BOHN.